United States Patent [19]
Migler

[11] Patent Number: 4,951,609
[45] Date of Patent: Aug. 28, 1990

[54] POLE-HOUSING DEVICE FOR NONHUMAN PRIMATES, WITH SQUEEZE-BACK MEANS, AND CATCHING AND REMOVAL MEANS

[76] Inventor: Bernard Migler, 1405 Autumn La., Cherry Hill, N.J. 08003

[21] Appl. No.: 286,809

[22] Filed: Dec. 20, 1988

[51] Int. Cl.$^5$ ................................................ A01K 1/04
[52] U.S. Cl. ........................................ 119/17; 119/15; 119/27; 119/120; 119/122
[58] Field of Search ............... 119/15, 17, 27, 98, 119/120, 123, 122

[56] References Cited

U.S. PATENT DOCUMENTS

| | | | |
|---|---|---|---|
| 226,897 | 4/1880 | Wood | 119/120 |
| 729,912 | 6/1903 | Andrews | 119/120 |
| 951,691 | 3/1910 | Marth | 119/123 |
| 2,294,781 | 9/1942 | Ingraham | 119/27 |
| 2,787,982 | 4/1957 | Cederberg | 119/98 |
| 2,790,419 | 4/1957 | Sullivan | 119/122 |
| 3,467,064 | 9/1969 | Glass et al. | 119/103 |
| 3,550,559 | 12/1970 | Long et al. | 119/20 |
| 3,650,245 | 3/1972 | Karnes | 119/20 |
| 3,693,592 | 9/1972 | Little | 119/27 |
| 3,885,527 | 5/1975 | Maffey et al. | 119/98 |
| 4,102,307 | 7/1978 | Cusick et al. | 119/27 |
| 4,201,158 | 5/1980 | Parker | 119/98 |
| 4,398,500 | 8/1983 | Koronkiewicz | 119/109 |
| 4,470,372 | 9/1984 | Norman | 119/27 |
| 4,656,967 | 4/1987 | Duksa | 119/120 |
| 4,685,424 | 8/1987 | Migler | 119/96 |
| 4,736,709 | 4/1988 | Migler | 119/120 |
| 4,747,372 | 5/1988 | Terry et al. | 119/120 |

FOREIGN PATENT DOCUMENTS

| | | | |
|---|---|---|---|
| 101176 | 3/1941 | Sweden | 119/120 |
| 2060344 | 5/1981 | United Kingdom | 119/120 |

OTHER PUBLICATIONS
Hohrd's Dairyman, Jun. 17, 1910.

Primary Examiner—Paul J. Hirsch

[57] ABSTRACT

A pole-housing device for nonhuman primates, especially monkeys, comprising a cage having poles and walls mounted in the perimeter of the device, and having an "H"-shaped squeeze-back means and a means for rapid removal of a nonhuman primate, wherein a nonhuman primate may be removed from the device by connecting the tether that is worn by the nonhuman primate to a tether-holder, disconnecting the tether from the sliding ring on the pole and opening an exit door adjacent to the pole, to remove the nonhuman primate, and wherein a nonhuman primate may be squeezed against the front or rear wall of the device and held there by pulling the squeeze-back, which is positioned between poles on opposite walls, against the front or rear wall.

12 Claims, 10 Drawing Sheets

POLE-HOUSING DEVICE FOR NONHUMAN PRIMATES, WITH SQUEEZE-BACK MEANS, AND CATCHING AND REMOVAL MEANS

FIELD OF THE INVENTION

This invention relates to:

(1) the housing of nonhuman primates on poles (pole-housing) with provision for a squeeze-back means and means for rapid catching and removal of a nonhuman primate from the device;

(2) the use of a tether-holder to hold a nonhuman primate that is wearing a collar and tether;

(3) the use of a portable squeeze-back for a nonhuman primate that is wearing a collar and tether; and (4) improvements in the means of catching a nonhuman primate tethered to a pole.

BACKGROUND OF THE INVENTION

A pole-housing device for monkeys and other nonhuman primates was disclosed in U.S. Pat. No. 4,685,424. In that disclosure Migler described a means of housing nonhuman primates by tethering each monkey to a ring mounted on a pole. The ring is free to slide up and down the pole allowing the nonhuman primate to climb up and down the pole. Other nonhuman primates are similarly attached to adjacent poles spaced so that the collars of adjacent nonhuman primates cannot extend past each other. This allows close physical contact and social interaction without the danger of entanglement of the tethers of adjacent nonhuman primates. Since there are no external walls to the device the invention is suitable only for nonhuman primates that are not aggressive toward their human caretakers, since an aggressive nonhuman primate would be able to attack the caretaker.

This difficulty was overcome by Migler in U.S. Pat. # 4,736,709. In this patent Migler described a means of enclosing a pole-housing device in such a way that a number of such devices could be placed side by side with the internal walls separating the nonhuman primates removed, while the external walls remained in place. This provided protection to the caretakers, while still allowing climbing and social interaction between the nonhuman primates.

While this modification solved the problem of safety for the caretaker, it did not solve the problem of the absence of a squeeze-back mechanism. Individual cages for nonhuman primates usually have a movable rear wall which, when pulled forward by arms that project through the front wall, squeezes the nonhuman primate against the front wall of the cage, holding the nonhuman primate there, and allowing an injection to be given through the bars of the front wall, or for other purposes. This mechanism is called a squeeze-back. This type of squeeze-back can be described as having a "U" shape, with the long arms of the "U" representing the long arms that project through the front of the cage and the horizontal section of the "U" representing the moveable rear wall.

The pole-housing devices described above does not include a squeeze-back. The combination of a squeeze-back of the type found in individual cages, with the existing pole-housing devices would not solve the problem of squeezing large nonhuman primates. In the case of the original pole-hosing device, there are no walls to squeeze the nonhuman primate against. In the case of the modified pole-housing device described in U.S. Pat. # 4,736,709, which does have walls, the poles are mounted in the interior of the device and would block the movement of the "U"-shaped squeeze-back toward the walls if the squeeze-back was installed between the poles; that is, the nonhuman primate could avoid being squeezed by positioning itself between a pole and the wall. If the squeeze-back was installed between the pole and the wall the nonhuman primate could escape being squeezed by positioning itself between the poles.

The solution to the problem, as taught here, is provided by mounting the poles in the wall (or perimeter) of the device. This permits the installation of a squeeze-back between poles on opposite walls of the device. The design of the squeeze-back may be a "U"-shape as is found in conventional individual cages. Two such "U"-shaped squeeze-backs would be needed, one that would slide towards the front wall and the other towards the rear wall. However, I teach a more efficient design, more suitable for pole-housing, having the shape of the capital letter "H". In this case only a single squeeze-back is needed. The "H"-shaped squeeze-back can be moved in either direction, that is, toward the front or rear, to squeeze a nonhuman primate against the front or rear wall. The "H"-shaped squeeze-back is adapted to permit movement towards the front or rear wall, to squeeze a nonhuman primate against the front or rear wall.

Another problem to be overcome in pole-housing is the difficulty in catching a nonhuman primate that is tethered to a pole. Nonhuman primates that are small may be caught with a gloved hand, but larger nonhuman primates, and in particular nonhuman primates with large canine teeth are too dangerous to be caught with a gloved hand and a safer means is needed. The present invention overcomes this difficulty by the use of a door adjacent to the pole, with a gap between the door and pole, such that the tether may be pulled out through the gap, connected to a tether-holder, disconnected from the sliding ring on the pole, and the door opened, allowing the nonhuman primate to be removed from the device, held securely at the end of the tether holder and away from the caretaker.

Another problem is the difficulty in grasping a nonhuman primate that is tethered to a pole. The squeeze-back that is built into the pole-housing device disclosed above does not provide a safe means of grasping a nonhuman primate. If the nonhuman primate is squeezed against the front wall and the door is opened in order to grasp the nonhuman primate the caretaker would probably be bitten by the nonhuman primate unless it is in a favorable position facing away from the caretaker. Also, if the nonhuman primate was squeezed against the door, then the door could not be opened to grasp the nonhuman primate. The present invention overcomes this problem in two ways. The first solution is by the use of a portable squeeze-back, which provides convenient and relatively safe access to the rear of the nonhuman primate once it has been squeezed against the wall. The second solution is by the use of a horizontal slot in the wall or door of the device. With this solution the tether is disconnected from the sliding ring, slid into the slot, and the tether is pulled out, forcing the nonhuman primate up against the wall or door. The door is then opened and the monkey is grasped.

This invention also includes several embodiments of the sliding ring and pole allowing alternative means of removing a nonhuman primate from a pole.

These inventions were disclosed by Migler in Disclosure Document numbers 187590, 193841, and 213052 of the Disclosure Document Program of the U.S. Patent Office.

SUMMARY OF THE INVENTION

This invention is directed to a pole-housing device for nonhuman primates with a squeeze-back means, and a catching and removal means, comprising a plurality of poles mounted in the perimeter of the pole-housing device, a door located adjacent to each pole and hinged so as to swing away from each pole, a plurality of gaps between the pole and the door sufficient to permit each tether to be pulled out through a gap, and a tether-holder, whereby a nonhuman primate is caught and removed from the device by a caretaker pulling the tether out through a gap, connecting the tether to a tether-holder, disconnecting the tether from the sliding ring of the pole, opening the door and removing the nonhuman primate, and a squeeze-back mounted within the device, which is slidable forwardly or rearwardly, whereby a nonhuman primate is squeezed against the front or rear wall.

This invention also includes a tether-holder, which is used to hold a nonhuman primate that is wearing a collar and tether, comprising a tether-connection means to connect the tether to the tether-holder, and a collar-blocker to block the collar of the nonhuman primate so as to hold it securely at the end of the tether-holder. This invention also includes a portable squeeze-back, comprising a floor, a slotted wall attached to the floor, and a movable wall, whereby a nonhuman primate that is held in a tether-holder may be squeezed and grasped. This invention also includes several embodiments of the sliding ring and pole allowing alternative means of removing a nonhuman primate from a pole.

BRIEF DESCRIPTION OF THE DRAWINGS

For the purpose of illustrating the invention there is shown in the accompanying drawing one form which is presently preferred, it being understood that the invention is not intended to be limited to the precise arrangements and instrumentalities shown, but is intended to be represented by the principles of the invention.

DETAILED DESCRIPTION OF THE DRAWINGS

Figure 1:
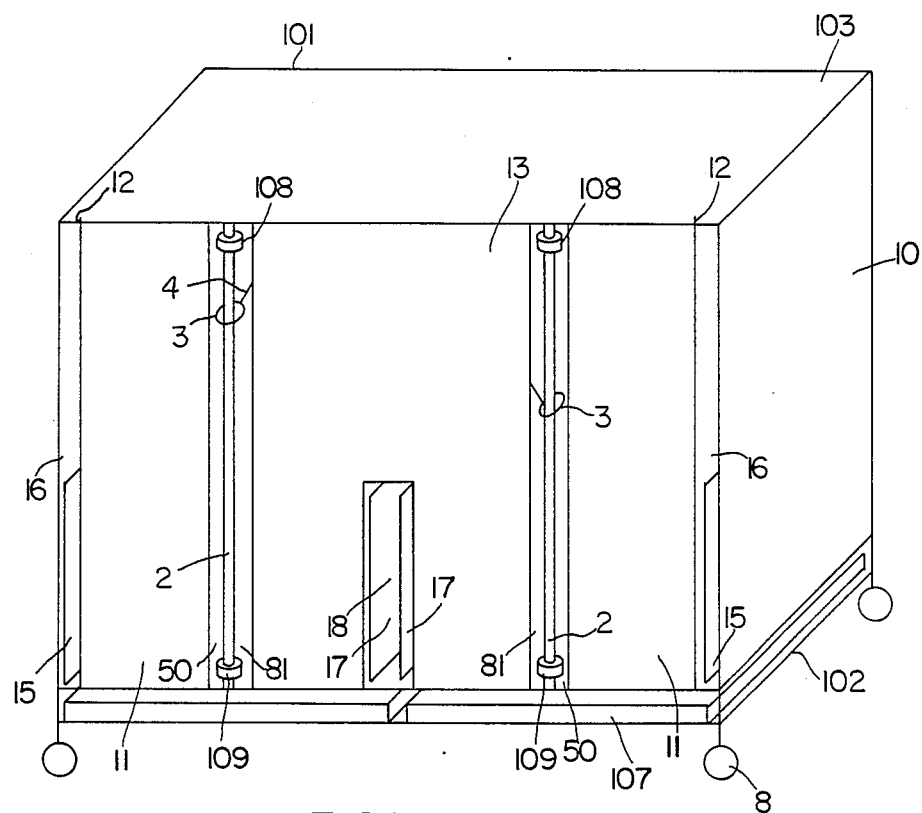
FIG. 1 is a perspective view of the invention.

Referring now to the drawings in detail FIG. 1 shows the pole-housing device consisting of a frame 101 mounted on a base support 102. The device has a ceiling 103, side walls 10, doors 11, hinges for the doors 12, front wall 13, poles 2 mounted in the perimeter of the frame, gaps 50 and 81 on both sides of said poles which permit a sliding ring 3 to slide up and down, tethers 4 (which are constructed of wire rope or chain or other durable and flexible material, partially obscured by one the doors 12 in this Figure), connecting each sliding ring to a collar worn by a nonhuman primate (collar and nonhuman primate not shown), an upper shaft collar 108 and a lower shaft collar 109, each of which has a diameter that is larger than the diameter of the sliding ring, wheels 8, and waste pans 107 suspended below the floor. Also shown in FIG. 1 are the long arms 15 and 17 of a squeeze-back protruding through gaps 16 and 18. The arms 15 and 17 are connected to a moveable wall in the interior of the device (not seen in this Figure), which, when pulled forward, squeezes a nonhuman primate against the front wall. The opposite side of the device has the same features as the side that is shown in the Figure. The device is constructed of durable materials such as steel or aluminum.

The doors 11, front wall 13, side walls 10, and ceiling 103, are shown as if they were opaque. Normally they would be constructed of bars or wire cloth. They are shown as if they were opaque for the purpose of clarity.

As will be described in greater detail below, a nonhuman primate is removed from the device by pulling the tether 4 out through the gap 50 between the pole 2 and the door 11, connecting the tether to a tether-holder, disconnecting the tether from the sliding ring 3 and opening the door.

As will also be described in greater detail below, a nonhuman primate is squeezed up against the door 11 or front wall 13 by first securing the nonhuman primate at the level of the squeeze-back (this can be done by lowering the upper shaft collar 108 or by other means) then pulling the arms 15 and 17 of the squeeze-back (not seen) forward through gaps 16 and 18, squeezing the nonhuman primate against the door 11 or front wall 13.

In another embodiment the ceiling is omitted or is removable.

The doors are locked using conventional means such as a chain and padlock, hook and eye, barrel bolt, or hasp (not shown).

Ideal dimensions of the device will vary according to the average size the nonhuman primates in the species. Ideal approximate dimensions of the device for cebus monkeys are: height, six and one half feet; width, three feet; length, six feet; pole diameter, one inch: distance between poles, 34 inches; height of pole, five and one half feet; distance between bars of perch, two inches.

Figure 2:
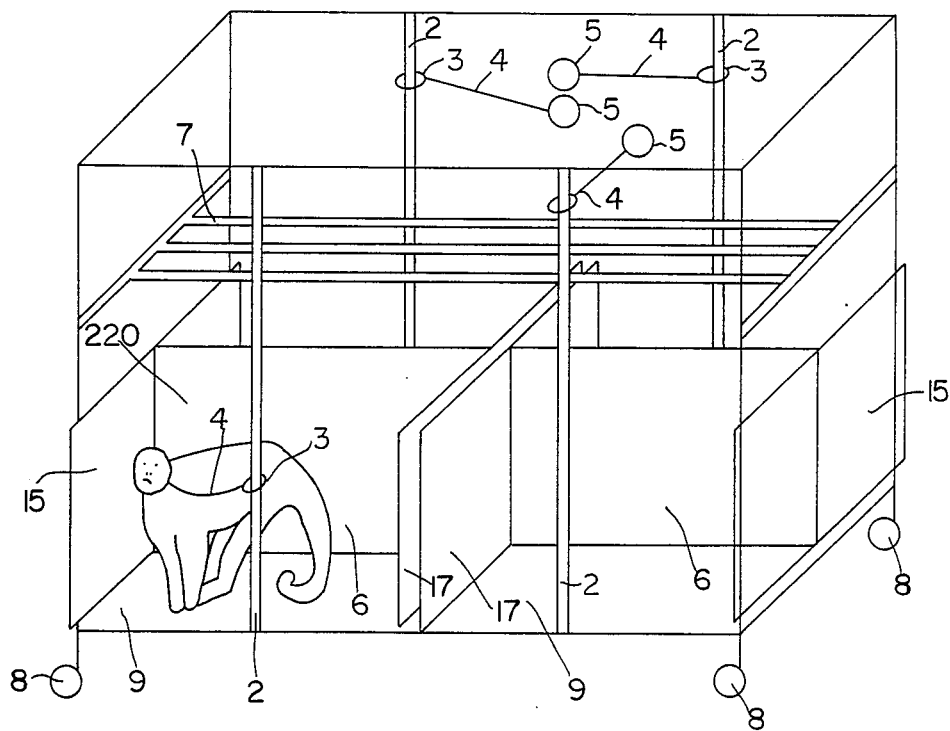
FIG. 2 is a perspective view of the invention with the ceiling, side walls, doors and front and rear walls removed to reveal the interior of the invention.

FIG. 2 presents the invention with the ceiling, side walls, doors and front and rear walls removed to reveal the interior of the invention. Each tether 4 is connected to a sliding ring 3 at one end and a collar 5 at the other end. Each tether 4 has a rotating joint, and a clip means (not shown in this Figure, but shown in greater detail in FIG. 5) so that the tether can be connected and disconnected from the sliding ring 3. The collars 5 of nonhuman primates that are tethered to poles 2 on opposite walls or that are adjacent to each other, can overlap, permitting close physical contact and social interaction without the possibility of entanglement of the tethers 4.

A moveable wall 6, which shall be referred to now as a squeeze-back, is positioned between the poles 2 on opposite sides of the device. Two squeeze-backs 6 are shown in FIG. 2 since there are two pairs of poles (on opposite walls). In other embodiments with one or more pairs of poles on opposite walls, a squeeze-back is installed for each opposed pair of poles. (Another embodiment has a single squeeze-back, extending across several pairs of poles). Each squeeze-back 6 has the shape of the capital letter "H", including the side arms 15 and 17. FIG. 2 also shows a perch 7 mounted above the squeeze-backs 6. The nonhuman primates can sit on the perch 7 and interact with each other. Space is provided between the perch 7 and the pole 2 so that the sliding ring 3 can move past the perch 7. The perch 7 is attached a short distance above the squeeze-back 6 but it may be positioned immediately above it in other embodiments, and there may be no perches or two or more perches 7.

Nonhuman primates, particularly males, occassionally attack each other. The squeeze-back 6 and its side arms 15 and 17 form an escape area 220 into which a nonhuman primate can go to escape from other nonhuman primates. The nonhuman primate shown in FIG. 2 is in its escape area 220.

In another embodiment the unitary "H"-shaped squeeze-back is replaced with two "U"-shaped squeeze-backs mounted back to back.

The device is mounted on wheels 8. The floor 9 is constructed of metal bars or wire cloth. The waste pans (not shown) are mounted below the floor. Food and water are provided for each nonhuman primate by conventional means such as a food can and water bottle (not shown). Nonhuman primate that are tethered to the sliding rings 3 and poles 2 are free to climb up and down in the interior of the device and may interact socially with each other without becoming entangled. This is achieved by spacing the poles so that the collars of adjacent nonhuman primates overlap but cannot extend past each other.

Figure 3:
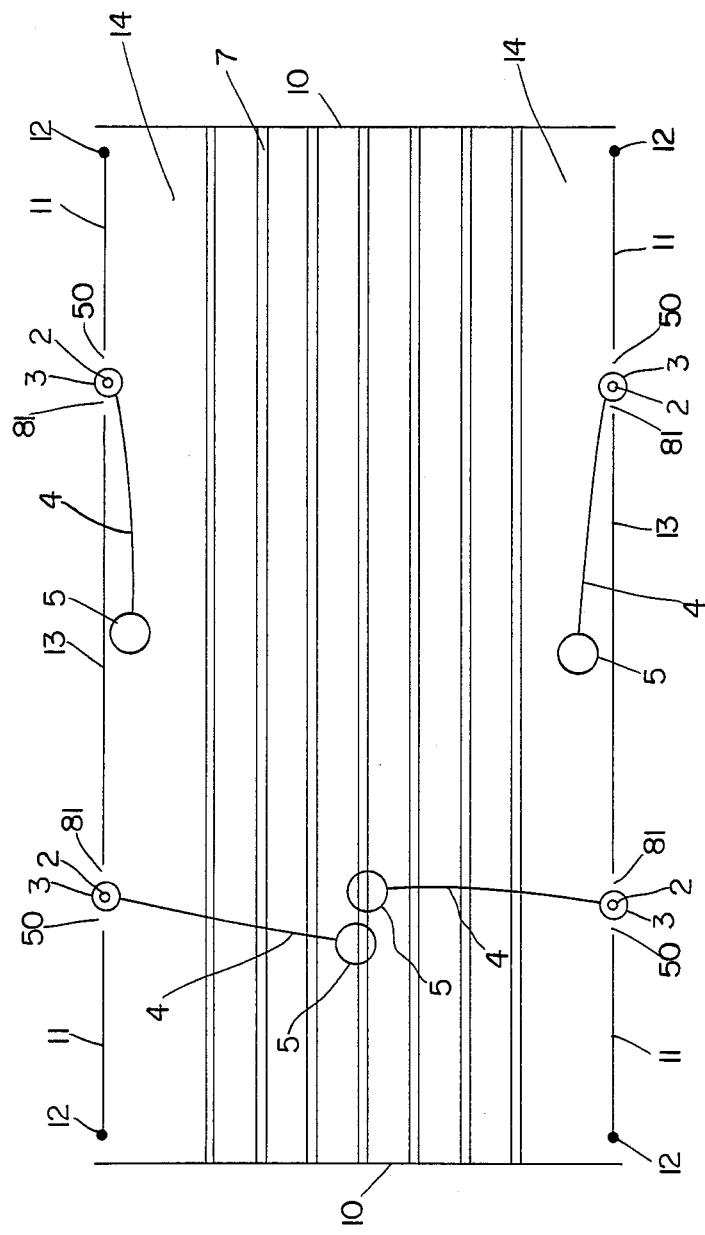
FIG. 3 is a horizontal cross section of the invention at the level of a perch.

FIG. 3 presents a horizontal cross section of the invention at the level of a perch 7, showing the poles 2, sliding rings 3, tethers 4, and collars 5. An end wall 10 is mounted at each end of the device. The end wall 10 may be removed, if desired, to allow the nonhuman primates to interact with nonhuman primates in a second pole-housing device (not shown) placed end to end. A front wall 13 is positioned between the poles 2. Doors 11 mounted on hinges 12 are positioned so that the side of the door adjacent to the pole 2 opens away from the pole. There is a first gap 81 between each pole 2 and the front wall and a second gap 50 between each pole and the adjacent door 11. The first and second gaps 81 and 50, provide enough space to permit the sliding ring 3 to move up and down. The perch 7 is also positioned a sufficient distance away from the pole 2 so as to allow the movement of the sliding ring 3. The second gap 50 is sufficiently wide to permit the tether 4 to be pulled through for the purpose of catching and removing the nonhuman primate, as will be described in greater detail below.

In another embodiment the front wall 13 is replaced with doors 11. In another embodiment the doors 11 are replaced with removable panels, or sliding panels. The term "door" as used herein refers to a hinged door, sliding panel or removable panel. The term "front wall" or "rear wall" as used herein refers to whatever arrangement of front wall and doors are used in an embodiment. A space 14 between the perch 7 and front wall or rear wall 13 is sufficiently wide to permit a nonhuman primate to climb from one level to another inside the device.

Figure 4:
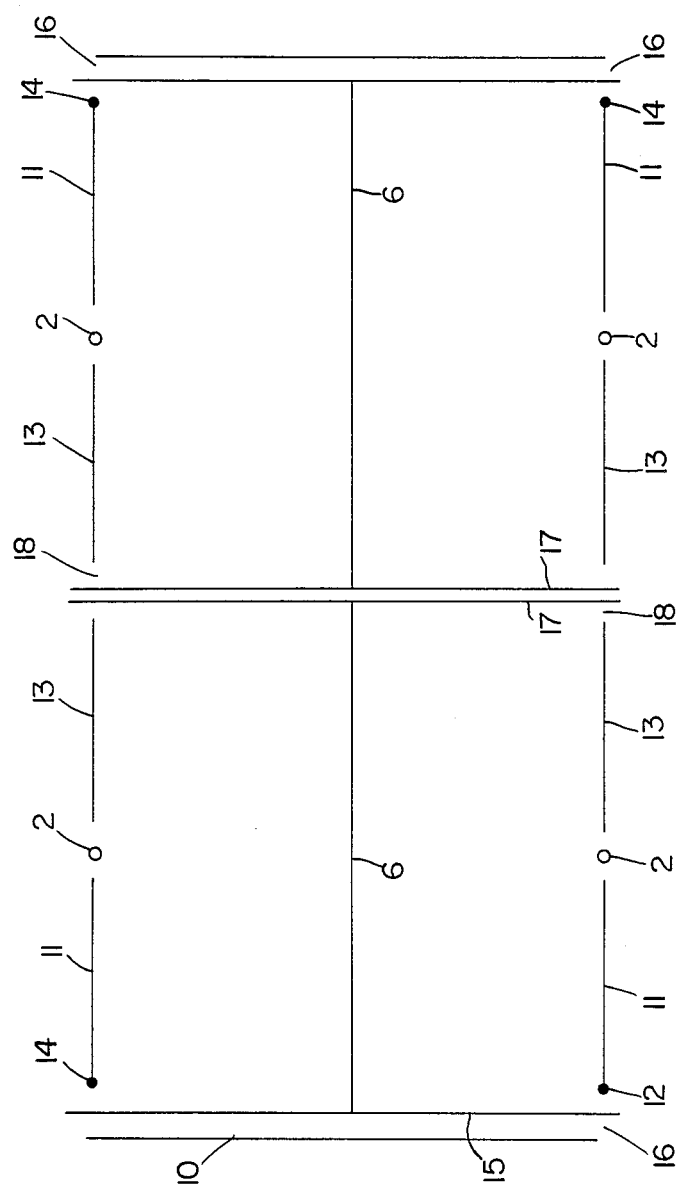
FIG. 4 is a horizontal cross section of the invention at the level of the squeeze-back.

FIG. 4 presents a horizontal cross section of the device at the level of the squeeze-back 6, showing the poles 2, end walls 10, doors 11, hinges 12, and front wall 13. The long arm 15 of each squeeze-back 6 that is adjacent to the end wall 10 projects through gap 16 between the end wall 10 and the door 11. The other long arm 17 of each squeeze-back 6 projects through a gap 18 in the front wall 13.

Figure 5:
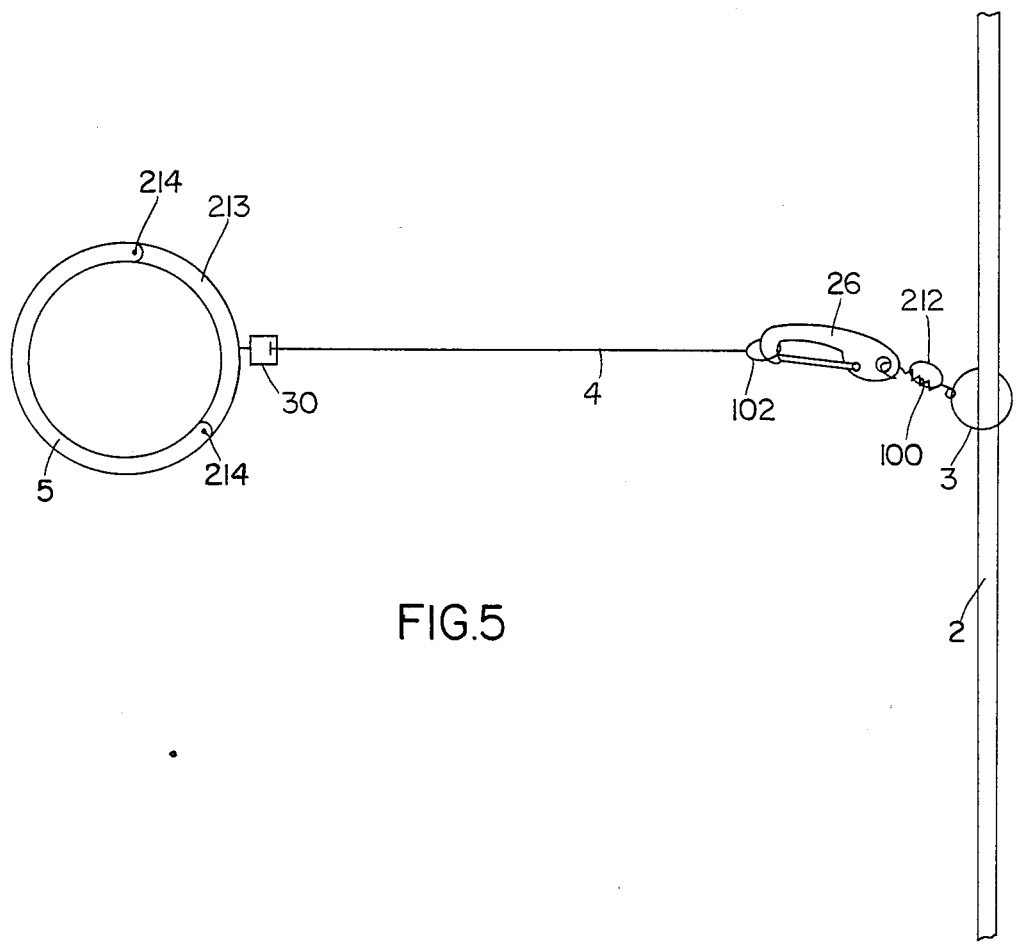
FIG. 5 presents a side view of a tether.

FIG. 5 shows the collar and tethering system in detail. The sliding ring 3 is shown mounted on a pole 2. A shock-absorbing spring 100 connects the sliding ring 3 to a clip 26. The term clip refers to any conventional quick disconnect means, such as a snap hook, a trigger snap, a removable link, or a spring-loaded barrel bolt. The clip 26 is connected to a loop 102 at one end of the tether 4. The other end of the tether 4 has a swivel 30. The swivel 30 is connected to the collar 5. The clip 26 (or other quick disconnect means) may be rapidly disconnected from the loop 102. A wire loop 212 through the spring 100 serves as a means to limit the extention of the spring, preventing it from being stretched excessively and possibly permanently deformed. The collar 5 is constructed of rigid material, such as aluminum bar and has a removable or hinged gate 213. To install the collar 5 on a nonhuman primate the gate 213 is opened, the collar 5 is placed on the nonhuman primate and the gate is closed with screws or rivets 214. To prevent abrasion of the skin plastic tubing, such as plasticized polyvinyl chlorine tubing ("Nalgene") (not shown) is used as an outer coat for the collar. The tether is constructed of flexible wire rope or chain.

The swivel 30 permits the nonhuman primate to rotate about the long axis of the tether without untwisting the wire rope or knotting the chain. The swivel 30 is shown connected immediately adjacent to the collar. This is the ideal position at which the swivel 30 can be safely placed; placement at any other position, for example midway down the tether 4 or next to the loop 102, or any closer to the sliding ring 3 creates a condition in which the wire rope or chain of the tether 4 may become untwisted or knotted if any contact friction occurs between the swivel 30 and the collar 5. Such friction can occur during catching with a tether-holder 20 when the tether 4 is pressed against the collar blocker 28. Similarly, friction occurs between the tether and the rear wall 28 of a carrying cage 222. In both cases untwisting or knotting is prevented by the placement of the swivel 30 immediately adjacent to the collar 5. Also, untwisting or knotting may occur when the tether 4 is pulled out during squeezing, as shown in FIG. 9C, unless the swivel 30 is immediately adjacent to the collar.

A second swivel is not necessarily required in the system, for example near the loop 102. If a second swivel is present then the swivel 30 near the collar 5 may become nonfuncional due to the accumulation of debris from the hands of the nonhuman primate, and the second swivel will rapidly become the only functioning swivel, creating the condition for untwisting or knotting of the tether 4. The debris from the hands of the nonhuman primate will not cause a single swivel 30 located near the collar 5 to become nonfunctional because it swivels frequently, being the only swivel.

In other embodiments the position of the various elements of the tether, with the exception of the swivel, may be rearranged, without altering its functions. For example, the shock absorbing spring 100 may be located between the swivel 30 and the loop 102; the position of the loop 102 and the clip 26 may be reversed. Also, the shock-absorbing spring 100 may be omitted.

In another embodiment the the wire rope is protected from being bitten and thereby frayed by the nonhuman primate by enclosing the wire rope in a cable housing such as a tightly wound expansion spring.

Figure 6A:
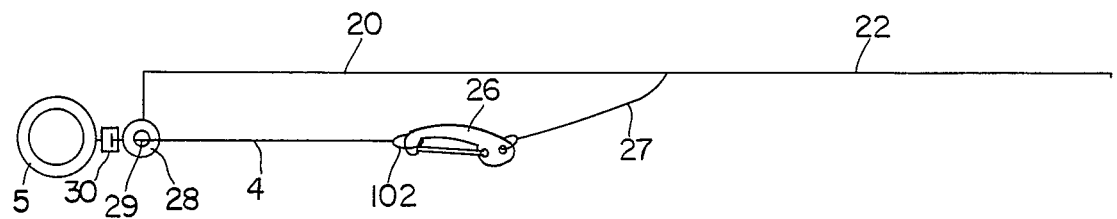
FIG. 6A is a side view of a tether-holder.

FIG. 6A presents a tether-holder 20, comprising a handle 22, a tether-connector 27 which may be a wire rope or chain attached at one end to the body of the tether-holder 20 and at the other end to a clip 26, and a collar-blocker 28, which may be a ring (as shown here, or an enlarged disc), having a hole 29 through which the tether 4 may pass, but through which the collar 5 may not pass. To hold a nonhuman primate with the tether-holder 20, the loop 102 of the tether 4 is passed through the hole 29 of the collar-blocker 28 and is then secured to the clip 26. The length of the tether-connector is fixed so that when the loop 102 is connected to the clip 26 the swivel 30 is positioned between the collar blocker 28 and the collar 5 so that the nonhuman primate may move freely without untwisting the wire rope or knotting the chain of the tether 4. The nonhuman primate will then be unable to escape since its tether is secured to the tether-holder, and unable to approach or attack the caretaker, because it is blocked by the collar blocker 28. It will be held securely at the end of the tether-holder. A caretaker, holding the handle 22, may then walk the nonhuman primate from place to place.

In another embodiment the tether-connector 26 and rope or chain 27 may be disconnected from the tether-holder 20 and reconnected by a disconnect means, to make connection to the loop 102 more convenient. With this embodiment the tether-connector 26 and rope 27 are passed through the collar-blocker 28, and connected to the tether 4; the tether is disconnected from the sliding ring and the tether and tether-connector 26 and wire rope 27 are pulled through the collar-blocker 28 and secured to the tether-holder 20.

Figure 6B:
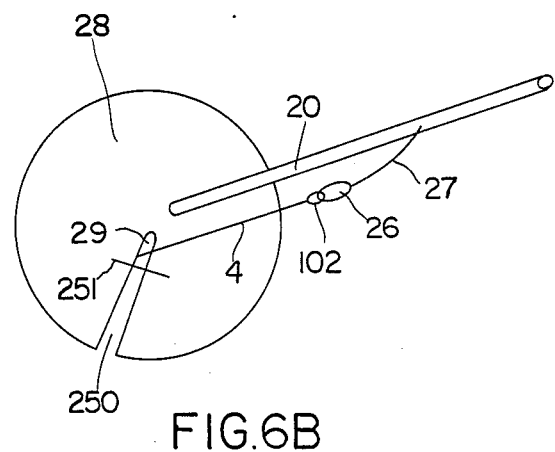
FIG. 6B is a perspective view of a tether-holder.

In another embodiment, shown in FIG. 6B, the collar-blocker 28 of the tether-connector 20 is an enlarged disc, approximately 12 to 24 inches in diameter, having a slot 250 in it so that the tether 4 may be slipped along the slot into the hole 29 at the center of the collar blocker. The tether 4 is retained in the slot by a spring loaded bar 251, or other conventional means such as a barrel bolt. The loop 102 of the tether 4 is connected to the clip 26 of the tether connector 27. When a nonhuman primate is held in this embodiment of the tether-holder it is easy to grasp an arm or leg or the tail, and then the body; it is also easy to walk the nonhuman primate when held in this tether-holder, with little danger of the caretaker being attacked or bitten.

Figure 7:
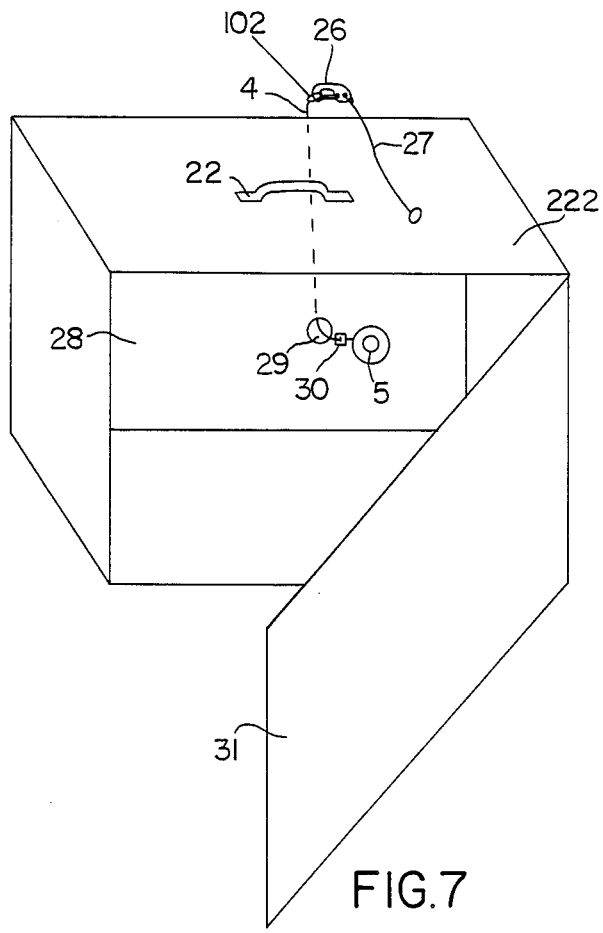
FIG. 7 is a perspective view of a carrying cage.

FIG. 7 presents an embodiment of the tether-holder in which the tether-holder is a carrying cage 222. The collar-blocker 28 is the rear wall. The tether 4 is passed through the hole 29 of the collar-blocker (rear wall) 28 and is connected to the clip 26 of the tether-connector 27, which is attached to the carrying cage 222. The swivel 30 permits freedom of motion of the nonhuman primate without untwisting or knotting of the tether 4.

In the preferred embodiment the tether-connector 27 is detachable from the carrying cage 222 to make connection to the loop 102 more convenient. A front door 31 may also be installed as well as a carrying handle 22. The collar 5 and nonhuman primate are held securely against the collar-blocker (rear wall) 28 and the nonhuman primate may be carried from place to place.

Figure 8:
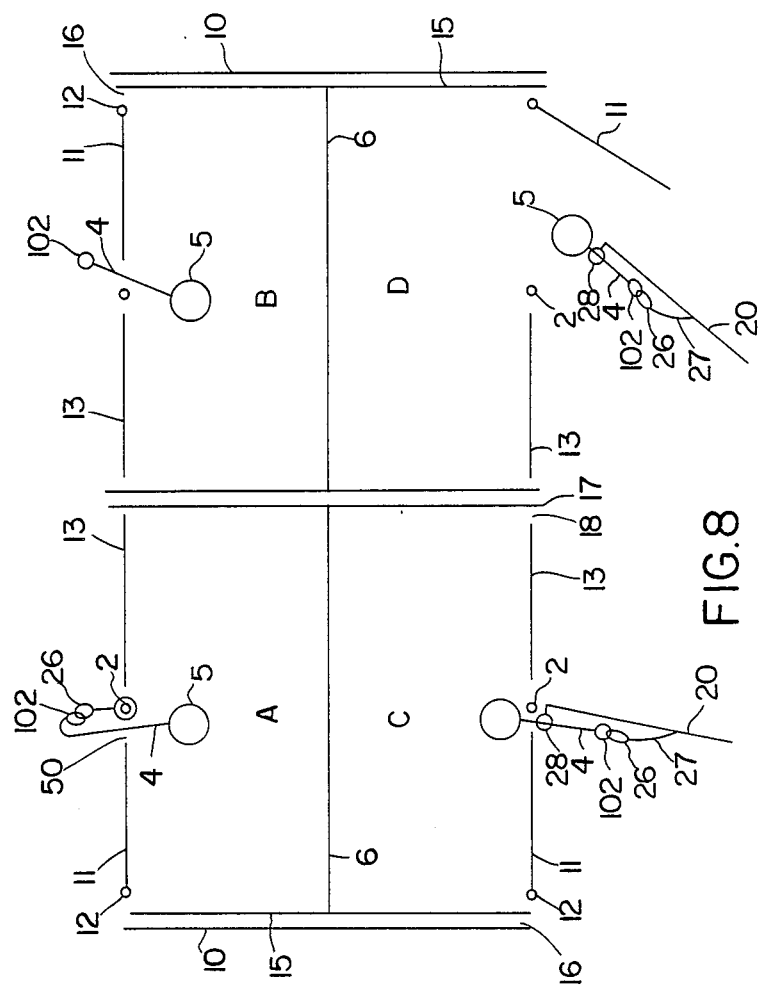
FIG. 8 is a horizontal cross-sectional view of the invention at the level of the squeeze-backs.

FIG. 8 shows the means by which a nonhuman primate is caught and removed from the pole-housing device. The Figure shows a horizontal cross section through the level of the squeeze-backs 6. The operation of catching and removing a nonhuman primate can be carried out at any level of the device. FIG. 8 shows the squeeze-back at the floor level of the device; however, the squeeze-backs are irrelevant to the function of catching and removal and could be omitted from the Figure. As shown for the nonhuman primate in section "A" of the Figure the tether 4 is first pulled out through the gap 50 between the pole 2 and the door 11, bringing out the loop 102 and clip 26. As shown in section "B" of the Figure the clip (not shown) has been disconnected and the clip and sliding ring have been allowed to fall leaving just the loop 102 on the outside of the device. (The loop is held securely, preferably by mechanical means, such as a hook, to prevent the nonhuman primate from escaping at this stage of the operation.) As shown in section "C" of the Figure the tether 4 and loop 102 are then passed through the collar-blocker 28 and the loop is connected to the clip 26. As shown in section "D" of the Figure the door 11 may now be opened and the nonhuman primate removed from the device, securely held by the tether-holder 20. The nonhuman primate is returned to the device by reversing the procedure.

Figure 9:
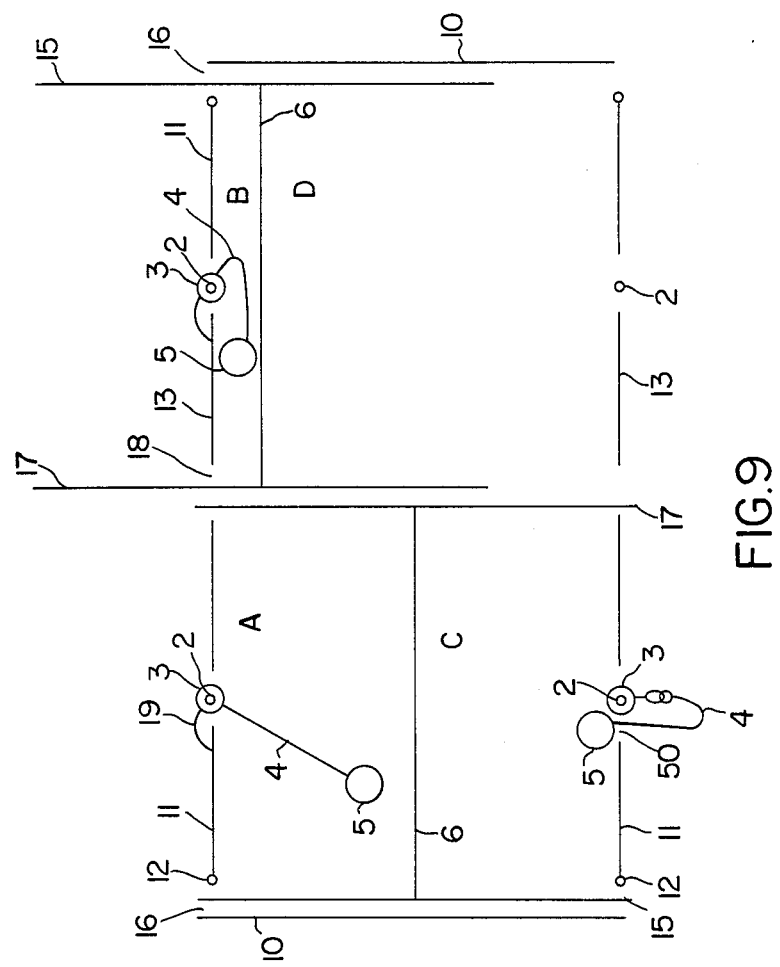
FIG. 9 is a cross-sectional view of the invention at the level of the squeeze-backs.

FIG. 9 shows the operation of the squeeze-back 6. As shown in section "A" of the Figure the sliding ring 3 is first pulled down to the level of the squeeze-back 6 and secured there by conventional means such as a short piece of chain 19, or by lowering the upper shaft collar (not shown, see 108 in FIG. 1). This prevents the nonhuman primate from escaping from the operation of the squeeze-back 6. As shown in section "B" of the Figure the long arms 15 and 17 of the squeeze-back are pulled through gaps 16 and 18. This squeezes the nonhuman primate (not shown) against the door 11 or front (or rear) wall 13. An injection can now be given through the bars or wire cloth of the door 11 or front wall 13. An alternative method is presented in section "C" of the Figure. The tether 4 is first pulled out through gap 50 causing the collar (and nonhuman primate, not shown) to be pulled up close to the front wall; the squeeze-back 6, which can be moved toward either the front or rear wall, is then slid toward the nonhuman primate, squeezing it.

In another embodiment the long arm 17 of the squeeze-back that is adjacent to the long arm 17 of the adjacent squeeze-back is a frame, and does not have bars or wire cloth. Instead a panel constructed of bars or wire cloth is installed between the two long arms 17. Thus, with either embodiment, the nonhuman primate cannot escape being squeezed by moving past the side arms 17.

In another embodiment the squeeze-back 6 is slid forward or rearward not by the caretaker pulling on the side arms 15 and 17, but by turning a screw drive, or other leveraged mechanism, or by motorized means. These embodiments are needed particularly when very strong nonhuman primates are to be squeezed and they resist being squeezed.

In another embodiment a ratchet is installed, of the type found in conventional individual cages, such that when the squeeze-back is slid forward a short distance, a spring-loaded bolt mounted on the front wall 13 slides into successive notches in the long arms 15 or 17 of the squeeze-back, allowing the squeeze-back to be slid forward, but preventing it from being slid backwards by the nonhuman primate. With the squeeze-back held securely in the pulled-forward position by this means, squeezing and holding the nonhuman primate, the caretaker may release the arms of the squeeze-back, freeing his hands to inject the nonhuman primate.

Figure 10:
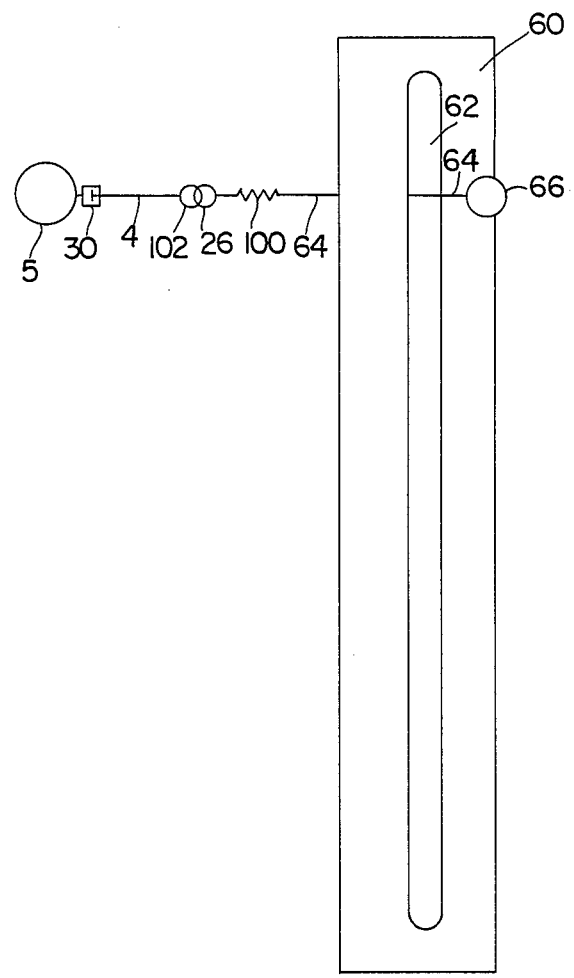
FIG. 10 is a front view of an embodiment of the invention utilizing a slotted pole.

FIG. 10 presents another embodiment of the invention in which the pole is replaced by a slotted pole 60 having a vertically oriented slot 62. The tethering system consists of a collar 5 connected to a tether 4 which terminates in a loop 102. The loop 102 is connected to a clip 26 which is connected to a shock-absorbing spring 100, having a spring extention limiter 212. The spring 100 is connected to a chain or wire rope which passes through the slot 62 to a ball or other enlargement 66 on the opposite side of the slot. The enlargement 66 cannot pass through the slot 62 thereby keeping the tether 4 and collar 5 held securely to the vertical member 60. The wire rope or chain 64 is free to slide up and down inside the slot 62 allowing the nonhuman primate to climb up and down.

I claim:

1. A pole-housing device for restraint or housing of nonhuman primates comprising:
   (a) a base support;
   (b) a frame attached to said base support, said frame having a perimeter in which front and rear walls are mounted;
   (c) a plurality of poles secured in said perimeter of said frame, for the attachment, on each pole, of a sliding ring, slidably attached to one end of a tether, wherein the poles are disposed adjacent to the walls, doors and perches of the pole-housing device, to permit said sliding ring to slide on said pole; and
   (d) a plurality of doors disposed so that one of said doors is adjacent to each pole and each door is disposed in relation to said adjacent pole and said door to form a gap allowing the tether to be pulled therethrough;
   whereby a nonhuman primate secured by a tether to a sliding ring on a pole is removed from the pole-housing device by pulling the tether through said gap, disconnecting the tether from the pole, opening the door adjacent to the pole, and removing said nonhuman primate from the pole-housing device.

2. The device of claim 1 having;
   (a) a sliding ring for attachment of said tether slidably attached to each pole, wherein the poles are disposed adjacent to the walls, doors and perches of the pole-housing device, to permit said sliding ring to slide on said pole;
   whereby a nonhuman primate secured by a tether to a sliding ring on a pole is removed from the pole-housing device by pulling the tether through said gap, disconnecting the tether from the pole, opening the door adjacent to the pole, and removing said nonhuman primate from the pole-housing device.

3. The device of claim 2 having;
   (a) said tether, connected at one end by a clip means to said sliding ring, and at the other end to a collar which is worn by a nonhuman primate;
   whereby a nonhuman primate secured by a tether to a sliding ring on a pole is removed from the pole-housing device by pulling the tether through said gap, disconnecting the tether from the pole, opening the door adjacent to the pole, and removing said nonhuman primate from the pole-housing device.

4. The device of claim 3 having;
   (a) a moveable squeeze-back positioned between poles in opposite walls; and
   (b) projecting arms attached to said squeeze-back
   whereby a nonhuman primate that is tethered to a pole is squeezed against said front or rear wall by pulling said projection arms, or otherwise moving said squeeze-back towards said front or rear wall, thereby squeezing and holding said nonhuman primate against said front or said rear wall.

5. The device of claim 4 having:
   (a) ratchet means permitting said squeeze-back to be moved towards a wall, squeezing and holding a nonhuman primate, and released from the hands of the caretaker, with the squeeze-back remaining in its pulled-forward position and without the nonhuman primate being able to move said squeeze-back away from said wall; and
   (b) means to move said squeeze-back away from said wall;
   whereby said caretaker can squeeze a nonhuman primate by moving said squeeze back toward said wall, release said squeeze-back, with the nonhuman primate being held squeezed and unable to move said squeeze back away, inject the nonhuman primate through the front wall of the device, or perform other actions, and then move said squeeze-back back to its normal position.

6. The device of claim 4 having;
   (a) a horizontal slot in the door or wall, said slot communicating with said gap or space between said pole and said wall or door;
   whereby a nonhuman primate may be physically grasped by disconnecting said tether from said sliding ring, then sliding said tether along said horizontal slot, then pulling said nonhuman primate up against said wall or door, then opening said door and grasping said nonhuman primate.

7. The device of claim 3 having;
   (a) an upper shaft collar or a lower shaft collr or both an upper and a lower shaft collar mounted on each said pole, each shaft collar having a diameter that is greater that the diameter of said sliding ring on said pole, so that said sliding ring cannot pass said shaft collar, and each shaft collar being able to be positioned and secured at any height on said pole;
   whereby the position of the nonhuman primate on the pole may be controlled by either lowering said upper shaft collar to any position to prevent said sliding ring from sliding up said pole, or raising said lower shaft collar to any position to prevent said sliding ring from sliding down said pole.

8. The device of claim 3 having:
   (a) said pole and said sliding ring replaced with a vertical member having a vertical slot;
   (b) said tether, passing through said slot and having an enlargement on a first end located on the outside of the pole-housing device, which enlargement cannot pass through said slot; and
   (c) a collar attached to a second end of said tether, located inside the pole-housing device;
   whereby a nonhuman primate that is wearing said collar can climb up and down said vertical member, with said tether held securely to said slot by said enlargement, and said tether sliding up and down inside said slot, and whereby said tether and collar may be disconnected from said vertical member.

9. The device of claim 3 having removable end walls, which, when removed, allows the nonhuman primates within the pole-housing device to interact with other nonhuman primates in a second, similar pole-housing device, without entanglement of their tethers.

10. The device of claim 3 having a floor, wheels, waste pans, and means for providing food and water to each nonhuman primate.

11. The device of claim 3 having one or more perches positioned between the poles, whereupon the nonhuman primates tethered to the poles may interact with each other.

12. The device of claim 3 having the poles secured to the outer edge of the door.

* * * * *